United States Patent [19]

Vaschuk et al.

[11] 4,225,541
[45] Sep. 30, 1980

[54] CONTACT TRAY FOR MASS AND HEAT EXCHANGE APPARATUS

[76] Inventors: Valery I. Vaschuk, 9 ulitsa Sokolinoi gory, 19, kv. 73; Gennady V. Starikov, ulitsa Zaraiskaya, 25, korpus 1, kv. 33, both of Moscow; Gennady P. Solomakha, ulitsa Pervomaiskaya, 56, kv. 25, Dolgoprudny Moskovskoi oblasti; Oleg S. Chekhov, ulitsa Shvernika, 11, korpus, 2, kv. 3, Moscow; Nikolai G. Shmuilov, ulitsa Bagritskogo, 22, kv. 163, Moscow; Iosif D. Beilinson, ulitsa Lesnaya, 13, kv. 9, Moscow; Boris S. Zats, ulitsa Titova, 6, Penza, all of U.S.S.R.

[21] Appl. No.: 864,143

[22] Filed: Dec. 20, 1977

[51] Int. Cl.² ............................................. B01D 3/22
[52] U.S. Cl. .......................... 261/114 VT; 261/114 R
[58] Field of Search ...... 261/114 R, 114 VT, 114 TC

[56] References Cited

U.S. PATENT DOCUMENTS

| | | | |
|---|---|---|---|
| 2,951,691 | 9/1960 | Nutter | 261/114 VT |
| 2,979,316 | 4/1961 | Houston, Jr. | 261/114 VT |
| 3,087,711 | 4/1963 | Glitsch | 261/114 R |
| 3,105,862 | 10/1963 | Doering, Jr. | 261/114 VT |
| 3,146,280 | 8/1964 | Forgrieve | 261/114 VT |
| 3,333,836 | 8/1967 | Bahout | 261/114 R |
| 3,427,007 | 2/1969 | Braun | 261/114 VT |
| 3,491,987 | 1/1970 | Eckert | 261/114 VT |
| 3,618,912 | 11/1971 | Braun | 261/114 VT |
| 3,700,216 | 10/1972 | Vitti et al. | 261/114 R |
| 3,770,255 | 11/1973 | Nutter | 261/114 VT |

FOREIGN PATENT DOCUMENTS

| | | | |
|---|---|---|---|
| 1442556 | 12/1968 | Fed. Rep. of Germany | 261/114 VT |
| 432910 | 6/1975 | U.S.S.R. | 261/114 VT |

*Primary Examiner*—Frank W. Lutter
*Assistant Examiner*—Gregory N. Clements
*Attorney, Agent, or Firm*—Steinberg & Blake

[57] ABSTRACT

The invention relates to contact trays with a self adjusting free section for rectification and absorption tray columns in gas (steam)-fluid systems operating in a wide range of gas (steam) loads. The contact tray comprises a base with apertures in every one of which a valve is mounted providing a one-way outlet of gas and having an upper wall, side walls, and position limiters to define the upper (open) and lower (closed) positions of the valve. Every valve is manufactured from a blank made in the form of a circular sector with a truncated apex, whose peripheral side and segment portions are bent to form side walls of the valve, one of the lower position limiters and the upper wall of the valve. This makes it possible to simplify the technology of manufacturing valves, improve the conditions of operation and raise the efficiency of the tray.

3 Claims, 10 Drawing Figures

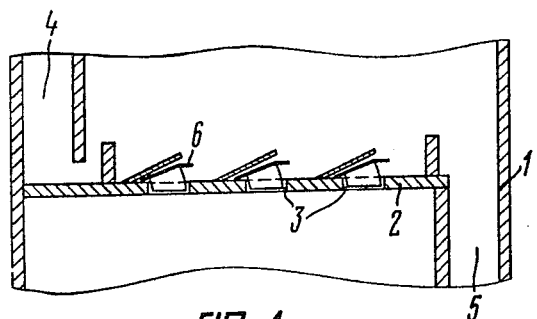
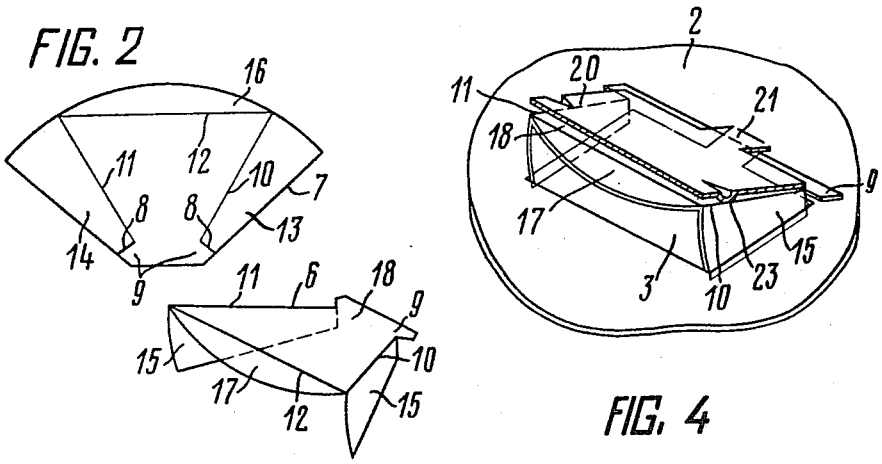
FIG. 1
FIG. 2
FIG. 3
FIG. 4

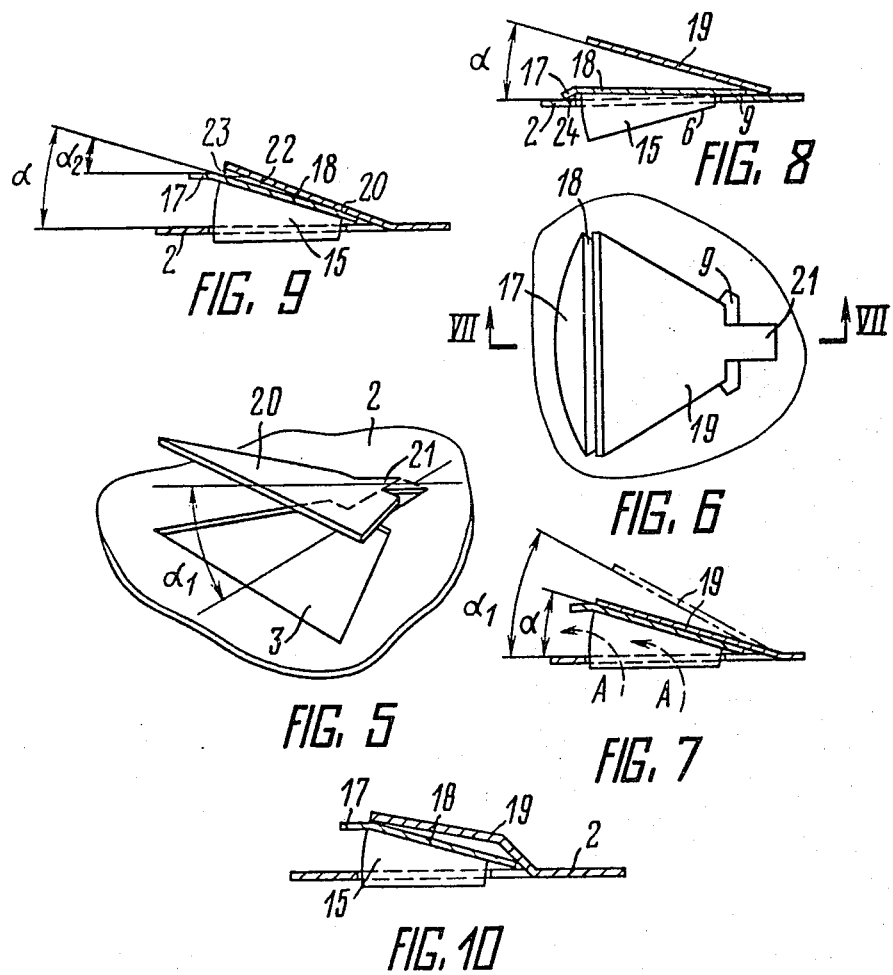

CONTACT TRAY FOR MASS AND HEAT EXCHANGE APPARATUS

The present invention relates to mass and heat exchange apparatus, and more particularly to contact trays with a self-adjusting free section for absorption and rectification tray columns operating in a wide range of gas (steam) loads, and with a high efficiency of separation.

At present the problem of developing mass-exchange tray apparatus capable of operating in a wide range of gas (steam) loads is closely connected with the development of valve contact devices capable of automatically adjusting the area of the section through which the gas is directed depending on its load, and thereby maintaining practically constant hydraulic resistance of the contact stage and its efficiency. However, in the majority of valve devices this effect is manifested to a great extent only when they operate under fixed fluid loads. Since in carrying out mass and heat exchange processes in the gas (steam) fluid systems the fluid load, as a rule, varies along with variations in gas loads, contact trays using valves with one-way outlet of gas will have considerably wider possibilities. Indeed, when such valves are rationally arranged on a tray, owing to employing part of kinetic energy of gas jets for transporting the fluid it is possible, first to ensure its flow over the tray base practically without a gradient and thereby improve the uniformity and, hence, the efficiency of operation of the contact stage, and, second, to achieve constancy of hydraulic resistance of the contact tray in case of variations in both the gas and fluid loads. For such trays the fluid throughput will be determined to a considerable extent by the gas load, whereas in the case of other trays in which the principle of directed inlet of gas in the fluid is not used this positive effect is not achieved.

Already known in the art are contact trays for mass exchange apparatus having valves with one-way outlet of gas wherein the valves are of diverse designs.

Every known tray comprises a base with apertures in which valves are mounted with one-way outlet of gas, having an upper wall, side walls, and limiters of the upper and the lower position of the valve.

As a rule, the valves are manufactured from blanks having a quadrangular shape, from which the upper and the side walls of the valve are formed by bending. The limiters of the upper and the lower position comprise legs integrally formed with the blank and being a continuation of the upper wall of the valve (or of two side walls thereof). Such legs are bent under the base of the tray when the valve is being mounted thereupon. As a result, the blank for the valve is of intricate shape, which involves great consumption of metal in the form of wastes after punching out such blanks.

In addition, during the operation of these valves the gas-fluid flow produces a dynamic effect on the upper walls of valves which appears as a result of circulation of the fluid along the height of the bubbling layer and causes lowering of the valves and closing of apertures of the trays. As a result, the operation of valves and the tray on the whole becomes more irregular, which disturbs the process. To prevent undesirable lowering of the valve during the operation, it is provided with additional devices.

It is an object of the present invention to eliminate the above disadvantages.

It is the principal object of the invention to provide contact trays for mass-exchange apparatus, which are simple to manufacture and assemble.

It is another object of the invention to provide contact trays for mass exchange apparatus which make it possible to improve the efficiency of their operation.

In accordance with the above and other objects in a contact tray for mass and heat exchange, apparatus is provided comprising a base with apertures, and valves mounted therein with one-way outlet of gas and provided with an upper wall, side walls, and limiters of the upper and lower positions of the valve. According to the invention, every valve is manufactured from a blank having a shape of a circular sector with a truncated apex, whose peripheral, side and segment portions are bent towards the base to form respectively the side walls of the valve, one of the limiters of the lower position of the valve and upper wall of the valve.

Thus, the blank for the valve, shaped as a sector with a truncated apex, makes it possible to simplify the technology and equipment for manufacturing valves with one-way outlet of gas (steam). When one of the lower position limiters is made from the segment portion of the blank, it is possible to prevent its sticking to the tray base, since their contact takes place at a point, which improves the smooth operation of the tray under low gas (steam) loads, especially in the presence of viscous or contaminated fluids and raises its efficiency. The shape of the side walls of the valve, which are the peripheral side portions of the sector-shaped blank, ensures the regular stroke of the valve in the aperture and prevents its jamming.

In accordance with the invention, the peripheral side portions of the circular sector are bent along its radius so that the upper wall of the valve without the limiters of the lower position is shaped as an isosceles trapezoid whose larger parallel side is directed towards the outlet of gas from the valve.

Radial bending of the side walls ensures such shape of the upper wall of the valve, which makes it possible to considerably increase the density of filling the tray with valves and, as a result, to reduce by many times the hydraulic resistance of the tray without increasing the height of the valve lift and without diminishing both the productivity of the tray and the efficiency of mass exchange on it. If there is no necessity in reducing the hydraulic resistance of the tray, then, without changing the latter, it is possible to decrease the height of the valve lift and intensify the mass exhange by increasing the depth of bubbling.

The invention is also characterized in that above the upper wall of the valve there is mounted a limiter of its upper position, disposed at an acute angle to the base, which makes it possible to simultaneously pre-set both the angle of inclination of the valve and the height of its lift.

It is possible to use one limiter for a group of valves on trays with valves arranged in parallel, which simplifies the design and assembly.

It is advisable that the limiter of the upper position of the valve be formed by a plate whose one side is secured to the edge of an aperture in the base on the side where the valve is disposed; this makes it possible to standardize this design of the tray and use all its elements for developing various trays with diverse arrangements of valves on them, as well as trays with any linear sizes. The design of the tray is determined during the assembly of limiters of the upper position on a standardized sheet with apertures for valves.

The plate of the limiter of the upper position can be constituted by a portion of the base formed by an incomplete punching out of an aperture; this reduces both the amount of wastes and the consumption of metal for making a tray of a definite size and design. This also makes it possible to reduce the dynamic effect on the valve of circulation flows existing in the bubbling layer on the tray, which results in better regularity of its operation, especially under heavy gas (steam) loads.

It is also advisable that the segment portion of the circular sector be bent towards the base at an angle equal to that of maximum lift of the valve, since with the segment portion bent at such angle the direction of inlet of gas (steam) in the fluid approximates to the horizontal, which reduces the entrainment of the fluid in the whole range of gas (steam) loads. The reduction of entrainment makes it possible to raise the gas (steam) throughput of the tray, since the upper limit of operation of the tray most often is confined to an acceptable rate of entrainment.

The invention is also characterized by that between the upper wall of the valve and the limiter of its upper position a gap is provided, which prevents jamming of the valve when lifted and improves the regularity of operation of the tray.

The invention is further explained by detailed exemplary embodiments of a contact tray for mass and heat exchange apparatus, according to the invention, with references to the accompanying drawings wherein:

FIG. 1 shows a tray of a mass and heat exchange apparatus shown in part, longitudinal section;

FIG. 2 shows a blank for a valve;

FIG. 3 shows a valve, according to the invention, perspective view;

FIG. 4 illustrates the position of the valve on the tray, perspective view;

FIG. 5 shows an embodiment of a limiter of the upper position;

FIG. 6 is a plan view of the valve with a limiter of the upper position;

FIG. 7 is a section along VII—VII of FIG. 6;

FIG. 8 shows a valve, according to the invention, in a lower position, longitudinal section;

FIG. 9 illustrates the position of the valve and the limiter of the upper position with a gap therebetween, longitudinal section;

FIG. 10 shows an embodiment of the limiter of the upper position, longitudinal section.

The proposed contact tray is mounted in any known manner in a vertical column 1 (FIG. 1) of a mass exchange apparatus and comprises a base 2 wherein apertures 3 are provided, a receiving compartment 4 and an overflow compartment 5. In every aperture 3 there is a valve 6 which provides a one-way outlet of gas (steam). The orientation of valves 6 on the tray can be effected in any known manner, depending on the fluid load, and, to raise the efficiency of mass exchange, vertical partitions can be mounted on the tray with the openings or slits of any known shape.

According to the invention, every valve 6 is manufactured from a blank 7 (FIG. 2) shaped as a circular sector with a truncated apex. In the blank 7 at the truncated apex there are small incisions 8 made for forming a limiter 9 of the lower position, i.e., a first lower position limiter. On the blank 7 there are marked lines 10, 11 and 12 along which peripheral side portions 13 and 14 which themselves form side walls 15 (FIG. 3) of the valve 6, and a segment portion 16 (FIG. 2) which forms an additional limiter 17 (FIG. 3) of the lower position i.e., a second lower position limiter 17, are bent respectively with respect to the body portion of the blank. The portions 13 (FIG. 2), 14 and 16 of the blank 7 are bent in one direction, namely towards the base of the tray. Depending on how the lines 10 and 11 are traced, the upper wall of the valve will have different shapes and thereby determine the shape of the valve 6. For example, if the lines 10 (FIG. 4) and 11 are parallel, the upper wall 18 of the valve is rectangular, as shown in FIG. 4, and the aperture 3 for the valve in the base 2 is also made rectangular. If the lines 10 and 11 are radii of a circular sector, as shown in FIG. 2, the upper wall 18 (FIG. 3) of the valve (not including the segment comprising the first lower position limiter 9) is shaped as an isosceles trapezoid. In this case the aperture 3 (not including the portion from which leg 21 is provided as noted below) for the valve in the base 2 is made as an isosceles trapezoid, as shown in FIGS. 5 and 6, and when such valve is mounted in the aperture 3, the larger parallel side of such trapezoid is directed towards the outlet of gas shown in FIG. 7 with arrows A.

In the lower position of the valve 6 (FIG. 8) its side walls 15 pass through the aperture, and the first and second lower position limiters 9 and 17, respectively touch the base 2 and prevent the valve 6 from falling through the aperture 3.

Above the upper wall 18 of the valve there is mounted a limiter 19 of the upper position, i.e., an upper limiter at an acute angle $\alpha$ to the base 2, equal to the angle of lift of the valves 6. This upper portion limiter 19 can be formed by a plate whose one side is secured to the edge of the aperture 3 of the base 2 on the side of the valve. However, a portion 20 (FIG. 5) of the base 2 formed in the case of an incomplete punching of the aperture 3, as shown in FIGS. 4 and 5 can be utilized as the upper position limiter defining plate. In this case the portions 20 of the base are bent at an angle $\alpha_1$ to the side where the valve will be mounted. It is desirable that the portion 20 of the base 2 be punched out so as to have a leg 21 under which the first lower position limiter 9 is disposed when the valve is mounted, as shown in FIGS. 4 and 6. When the valves are being mounted, all the plates forming the upper position limiters 19 (FIG. 7) are bent at an angle $\alpha_1$ which is somewhat larger than the angle $\alpha$ of lift of the valves, and, after mounting the valves, the plates of the limiter 19 are lowered so that they are disposed at an angle $\alpha$ to the base. In such position the upper limiter 19 holds the valve so that when the valve is lifted its side walls 15 are not fully outside from the aperture 3, i.e., still have their free side edges disposed below the plane of the base 2.

The segment portion 16 (FIG. 9), i.e. the second lower position limiter 17 of of the valve 6, is bent towards the base 2 at an angle $\alpha_2$ equal to the angle $\alpha$ of maximum lift of the valve.

When the valve is in its fully lifted position, the upper position limiter 19 can either touch its upper wall 18, as shown in FIG. 7, or a gap 22 (FIGS. 4 and 9) can be provided between them. This gap 22 can be defined by projections 23 made on the upper position limiter 19 on the side facing the upper wall 18 of the valve. However, this gap can be provided by any other means, for example, by making projections on the upper wall 18 of the valve, or by making the limiter 19 curvilinear, as shown in FIG. 10.

During operation of the mass exchange apparatus under small gas loads the valves 6 are in their closed, i.e. lower position; the valve 6 (FIG. 8) rests upon the base 2 along with the lower position limiters 17 and 9 while the side walls 15 pass through the aperture 3 in the tray.

Since the second lower position limiter 17 is the segment portion of the circular sector, it contacts base 2 at a central point. As seen in FIG. 8, when the valve is in its closed position, slits 24 are defined to the sides of the point at which the circular segment 17 contacts base 2 by the portion of the surfaces of circular segment 17 and base 2 which extend forwardly of the forward edges of side walls 15. In this manner, gas can pass through the slits 24 to come in contact with the fluid carried by base 2. As the gas load increases the valve starts opening, i.e. lifting, until the upper wall 18 of the valve contacts either the upper position limiter 19, or its projections 23 (FIG. 9). Gas (steam) starts coming onto the tray through the slot thus formed and passes in the form of jets in the direction shown by arrows A (FIG. 7) through the fluid coming from the receiving compartment 4 (FIG. 1). The gas jets and fluid streams intensively interact. The gas stream then passes onto the next higher tray of the apparatus, while the fluid flows through the overflow compartment 5 onto the next lower tray.

What is claimed is:

1. A contact tray for mass and heat exchange apparatus comprising:
   a planar base adapted to be rigidly secured in a vertically extending column, a plurality of apertures being formed in said base; and
   a plurality of valves, each of which is located in a respective one of said apertures, each of said valves comprising a member formed of sheet material having the initial configuration of a circular sector with a truncated apex, said member being defined by a body portion, a pair of peripheral side portions and an outer segment portion having an arcuate edge region extending between said peripheral side portions each of said peripheral side portions being bent towards said base along a respective radius of said member with respect to said body portion to form opposed valve side walls integral with and extending inwardly towards said base from said valve member body portion and so that the upper wall of the valve is shaped substantially as an isosceles trapezoid whose larger parallel side is directed towards the direction of outlet of gas from the valve, and said outer segment portion being bent with respect to said body portion to extend inwardly towards said base from said valve member body portion to form a limiter portion of said valve for limiting the movement thereof to its closed or lower position by way of contact of a point on the arcuate edge region thereof with said base, said body portion forming the upper wall of the valve and an upper position limiter portion for limiting the movement of the valve to its open or upper position, said upper position limiter portion constituting a plate punched from said base to form the aperture in which a respective valve is located, said plate extending upwardly at an acute angle to said base from one edge thereof which is integrally connected to said base.

2. A contact tray according to claim 1, wherein the outer segment portion of the circular sector member is bent towards said base at an angle thereto equal to the angle defined by said valve upper wall and said base when the valve is in its maximum open or upper position.

3. A contact tray according to claim 1, further including means for forming a gap between the upper wall of said valve and the upper position limiter when the valve is in its maximum open or upper position.

* * * * *